United States Patent
Cosby et al.

(10) Patent No.: US 12,072,867 B2
(45) Date of Patent: Aug. 27, 2024

(54) FUTURE TRANSACTION PROCESSING

(71) Applicant: Oracle International Corporation, Redwood Shores, CA (US)

(72) Inventors: Douglas Ray Cosby, Austin, TX (US); Anurag Garg, Cupertino, CA (US); Byron Kevin McKenzie, Garland, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/861,579

(22) Filed: Jul. 11, 2022

(65) Prior Publication Data

US 2023/0259505 A1    Aug. 17, 2023

Related U.S. Application Data

(60) Provisional application No. 63/303,251, filed on Jan. 26, 2022.

(51) Int. Cl.
*G06F 16/23*    (2019.01)

(52) U.S. Cl.
CPC ...... *G06F 16/2372* (2019.01); *G06F 16/2322* (2019.01)

(58) Field of Classification Search
CPC .......................... G06F 16/2372; G06F 16/2322
See application file for complete search history.

(56) References Cited

U.S. PATENT DOCUMENTS

| | | | |
|---|---|---|---|
| 6,948,171 B2 | 9/2005 | Dan et al. | |
| 7,461,008 B2 | 12/2008 | Garrow et al. | |
| 7,640,229 B1 | 12/2009 | Kaufmann et al. | |
| 8,065,277 B1 | 11/2011 | Gardner et al. | |
| 9,208,167 B1 | 12/2015 | Henderson | |
| 10,275,281 B2 | 4/2019 | Pradeep et al. | |
| 10,296,629 B2 | 5/2019 | Chidambaran et al. | |
| 11,106,658 B2 | 8/2021 | Cseri et al. | |
| 2005/0044108 A1* | 2/2005 | Shah | G06F 16/288 |
| 2005/0044187 A1* | 2/2005 | Jhaveri | H04L 9/40 |
| | | | 709/219 |

(Continued)

OTHER PUBLICATIONS

"Conflict Analysis and Collision Detection", Retrieved from https://techdocs.broadcom.com/us/en/ca-enterprise-software/business-management/ca-service-management/17-1/using/change-management/conflict-analysis-and-collision-detection.html#concept.dita_ed6863c6550d6e8342931db43bbc378a8640ab76_DetectandInvestigateConflicts, Sep. 22, 2020, 3 Pages.

(Continued)

*Primary Examiner* — William Spieler
(74) *Attorney, Agent, or Firm* — Invoke

(57) ABSTRACT

Techniques for managing requests to modify a data set at future times are disclosed. The system receives a request to modify the data set at a future time, such as in a future time window. The system generates a representation of the data set at the future time. The system determines the future state of the data set based on the current state of the data set and requested future modifications to the data set. The system determines whether a conflict exists between the request to modify the data set at the future time and another scheduled request to modify the data set at the future time. Based on determining whether a conflict exists, the system performs one or more of scheduling the request to modify the data set at the future time and performing a remediation action to address the conflict.

19 Claims, 7 Drawing Sheets

(56) References Cited

U.S. PATENT DOCUMENTS

| | | | |
|---|---|---|---|
| 2005/0044530 A1* | 2/2005 | Novik | G06F 16/27 717/122 |
| 2007/0214159 A1* | 9/2007 | Lawson | G06F 16/2379 |
| 2008/0077612 A1* | 3/2008 | Zobin | G06F 16/2477 |
| 2009/0024999 A1 | 1/2009 | Ingman et al. | |
| 2010/0185595 A1* | 7/2010 | Gopalakrishnan | G06F 16/219 707/E17.017 |
| 2013/0006920 A1* | 1/2013 | Kreindler | H04N 5/76 707/E17.005 |
| 2014/0006768 A1 | 1/2014 | Carter et al. | |
| 2014/0282586 A1* | 9/2014 | Shear | G06F 9/50 718/104 |
| 2015/0012489 A1* | 1/2015 | Ceribelli | G06Q 30/04 707/611 |
| 2018/0018361 A1 | 1/2018 | Liang et al. | |
| 2018/0349408 A1 | 12/2018 | Jewell et al. | |
| 2019/0340166 A1* | 11/2019 | Raman | G06F 16/2255 |
| 2021/0064602 A1* | 3/2021 | Mietke | G06F 16/2358 |
| 2021/0117410 A1* | 4/2021 | Sekniqi | G06F 16/2379 |
| 2023/0106118 A1* | 4/2023 | Feng | G06F 16/2322 718/101 |

OTHER PUBLICATIONS

"Conflict calendar", Retrieved from https://docs.servicenow.com/bundle/sandiego-it-service-management/page/product/change-management/concept/change-conflict-calendar.html#view-change-conflict-calendar, Retrieved on Jul. 2022, 2 Pages.

"Data Factory scheduling and execution", Retrieved from https://docs.microsoft.com/en-us/azure/data-factory/v1/data-factory-scheduling-and-execution, Oct. 22, 2021, 29 Pages.

"Manage your change schedules and resolve conflicts", Retrieved from https://docs.servicenow.com/bundle/sandiego-it-service-management/page/product/change-management/task/use-conflict-calendar.html, Retrieved on Jul. 2022, 2 Pages.

"ServiceNow—Conflict detection", Retrieved from https://docs.servicenow.com/bundle/sandiego-it-service-management/page/product/change-management/concept/c_ConflictDetection.html, Retrieved on Jul. 2022, 2 Pages.

Sheng et al., "Scheduling OLTP Transactions via Machine Learning", Retrieved from https://arxiv.org/pdf/1903.02990.pdf, May 29, 2019, 28 Pages.

* cited by examiner

FUTURE TRANSACTION PROCESSING

BENEFIT CLAIMS; RELATED APPLICATIONS; INCORPORATION BY REFERENCE

This application claims the benefit of U.S. Provisional Patent Application 63/303,251, filed Jan. 26, 2022, which is hereby incorporated by reference. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to the processing of future transactions to be made to a dataset. In particular, the present disclosure relates to receiving, displaying, organizing, and remediating conflicts among requests for future changes to a future state of a dataset.

BACKGROUND

Organizations and enterprises generate large quantities of data that must be searchable to be useful to the organization. For example, a change in organization structure may result in varying zones of responsibility for employees that must be tracked for the organization to operate efficiently. A merger of two organizations may result in employee positions and entire cost centers being added, removed, or combined. A simple purchase transaction may include a receipt containing details about the products or services purchased, the store location, the buyer, payment terms, the transaction date, and so on. Sales transactions are booked in an organization's general ledger and posted to revenue accounts. Costs associated with creating and fulfilling purchases are recorded in expense accounts. Cost centers record expenses of companies and organizations within the company that support sales transactions. Every aspect of an organization or enterprise that describes and supports the functions of the enterprise generates data. Searching and analyzing the data—which is often in the terabytes—is vital to improve functioning of an enterprise.

Enterprise data management systems allow different entities in an enterprise to access the enterprise data using different applications. For example, an accounting department runs an application that accesses one portion of the enterprise data. A sales department runs an application that accesses another portion of the enterprise data. The data accessed by the different entities may be entirely different or it may overlap. When one entity changes enterprise data, the enterprise data management system synchronizes the changes across any applications running in the enterprise to maintain consistency in the enterprise data. An enterprise may allow entities to request to change data in the enterprise data dataset at a future time. For example, the enterprise may schedule monthly updates to the dataset, and the enterprise may allow entities to schedule changes to the dataset to correspond with the monthly updates. However, when one or more entities request changes that affect data accessed by other entities, data modification conflicts may arise. For example, one entity may request to modify a node at a future time. However, another entity may request to delete the node at a future time preceding the modification.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
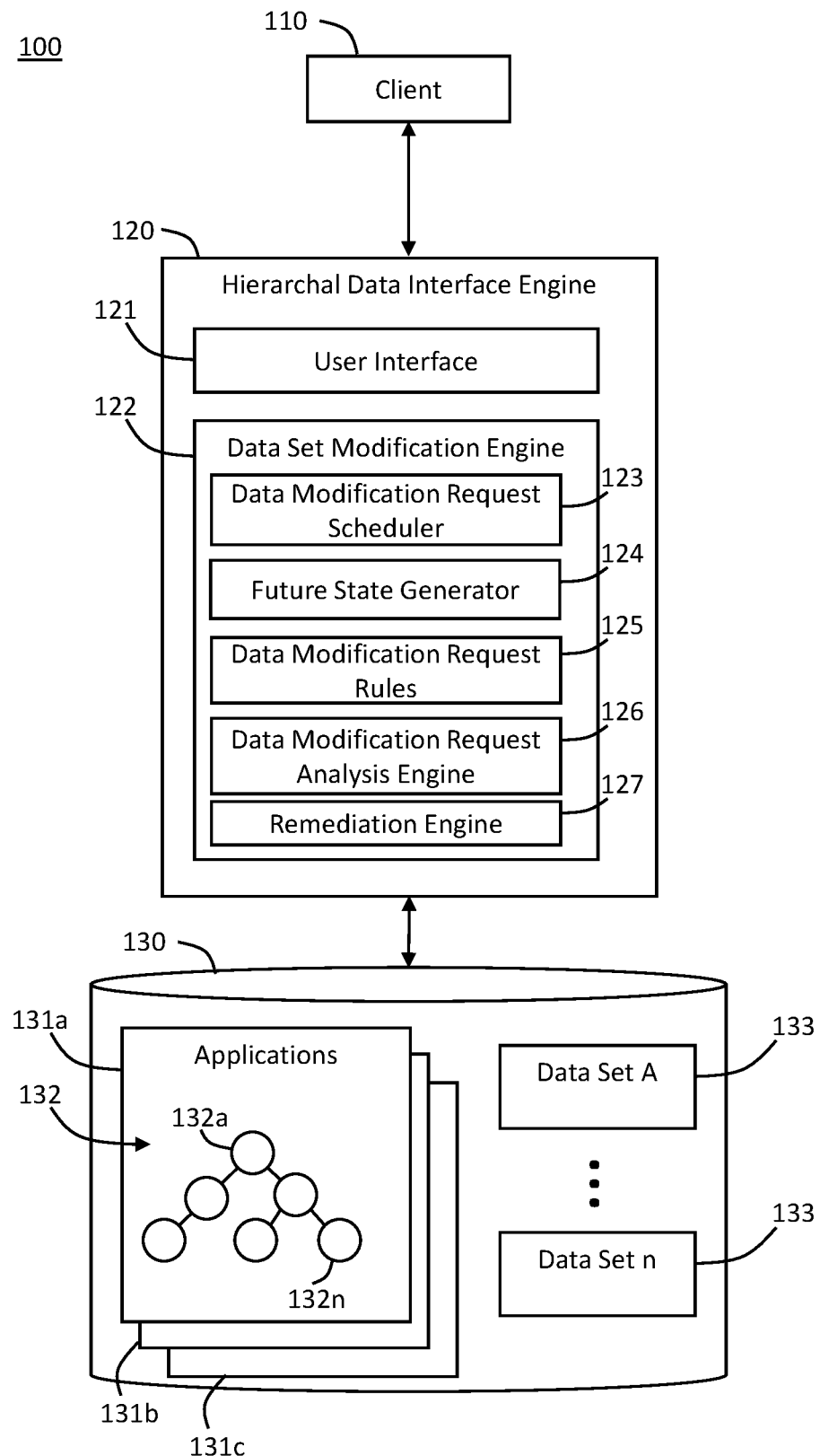
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MANAGING REQUESTS FOR FUTURE MODIFICATIONS TO A DATASET
4. MANAGING ACCESS TO FUTURE DATASET MODIFICATION WINDOWS
5. QUEING REQUESTS IN TIME-INDEPENDENT REQUEST QUEUES
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

Embodiments manage a collection of requests to modify a data set at future times specified by the requests. When multiple requests specify the same future time (or future time period), the system determines an order for consecutively performing the scheduled modifications. Furthermore, the system identifies conflicts between the modifications, requested at future times, based in part on future states for the data set. The system may further identify a conflict if an already scheduled modification is no longer valid due to an operation executed on the data set subsequent to scheduling of the modification. The system may compute and present a future state of a data set corresponding to a future time at which a new modification is being scheduled. The system presents a Graphical User Interface (GUI) that illustrates a set of modifications scheduled at various corresponding future times.

In an example, the system receives multiple requests that specify a same future time, or a same future time window for execution. The multiple requests may correspond to modifications that are (a) to be scheduled at 9 pm on Feb. 12, 2022, (b) to be scheduled at the end of the first quarter, or (c) to be scheduled on the last day of the month. The system may schedule the modifications, corresponding to the same future time or future time window, for consecutive execution in accordance with a particular order. The system may determine the particular order for the modifications to be executed at the same time to avoid conflicts or errors to the extent possible. A first operation that reads data from a particular memory location is scheduled for execution prior to a second operation that deletes data at the particular memory location. The system may determine the particular order based on when the requests are received such that an earlier received request is scheduled for execution prior to a later received request. The system may determine the particular order based on a requestor of the requests.

An embodiment identifies conflicts between modifications of a data set requested for execution in the future based in part on expected future states of the data set. In an example, the system receives a first request at 10 am on Feb. 1, 2022, to delete a node x in a hierarchal data set at 11 pm on Feb. 3, 2022. Based at least on the first request, the system schedules a deletion of the node at 11 pm on Feb. 3, 2022. Thereafter, the system receives a second request at 9 am on Feb. 2, 2022, to modify a property of the same node x at 11:30 pm on Feb. 3, 2022. Prior to scheduling the modification of the property of the node x at 11:30 pm on Feb. 3, 2022, the system determines a future state of the hierarchal data set that is expected on Feb. 3, 2022, at 11:30 pm. The future state of the data set on Feb. 3, 2022, at 11:30 am may be determined, for example, based on (a) a current state of the hierarchal data set at 10 am at 9 am on Feb. 2, 2022, and (b) modifications scheduled between a current time and the future time of 11:30 pm on Feb. 3, 2022. The system applies the modifications scheduled between the current time and the future time to a copy of the current state of the data set to determine a future state of the data set expected at 11:30 pm on Feb. 3, 2022. The future state of the data set does not include the node x since the future, scheduled modification of the data set at 11 pm on Feb. 3, 2022, deletes node x from the system. Thereafter, the system determines that the operation to modify node x cannot be scheduled for 11:30 pm on Feb. 3, 2022, since node x does not exist in the future state of the data set expected at 11:30 pm on Feb. 3, 2022.

In response to determining that the operation to modify node x cannot be scheduled, the system generates a notification re the conflict and/or performs a remediation action. As an example, the system may be configured to decline any request, such as the second request that results in a conflict. The system may be configured to discard already scheduled modifications that conflict with later submitted modification requests. The system may be configured to identify and present a set of two or more conflicting requests to a user for the user to select which request(s) is to be executed and which request(s) is to be discarded. The system may execute the request, of a set of conflicting requests, with a higher priority which discarding the request with a lower priority.

Subsequent to scheduling modifications, an embodiment monitors operations being executed and/or a state of a data set to ensure that the operations and/or state of the data set do not conflict with modifications already scheduled for a future time. In an example, the system may store a modification to a particular database record to be executed in three weeks. An application, executed by the system, deletes the particular database record. In response to the deletion, the system determines that the scheduled modification, to be executed in three weeks, can no longer be executed. In response to detecting this conflict, the system generates a notification and/or performs a remediation action.

An embodiment computes and presents future states of a data set. In an example, a user selects a time and date for scheduling a modification of a data set. In response to the selection of the time and date, the system computes an expected future state of the data set by applying (a) transactions that have been scheduled in the future prior to the selected time and date to (b) a copy of the current state of the data set. In an example, a database view may present information from the computed future state of the data set. The database view may be helpful for a user defining the modification to be executed at that future time. In another example, the system may present a hierarchy of nodes that is expected at a future time based on a current hierarchy of nodes and scheduled modifications between a current time and that future time.

One or more embodiments display a GUI illustrating various modifications that have been scheduled at various times in the future. The modifications may be displayed, for example, in relation to a timeline. Alternatively, or in addition, the system may display a timeline with selectable interface elements corresponding to different time windows at which the data set may be modified. Each interface element may be selected by a user to add a modification to be executed at a time corresponding to that interface element. The system may display a subset of interface elements, corresponding to the time periods at which the data set may be modified, based on a set of permissions associated with a user. The system may restrict modifications at times that do not correspond to any of the interface elements. Alternatively, in response to selection of a time that does not correspond to any current interface element, the system may generate a new interface element representing the selected time. For example, data set modification windows may exist for daily, weekly, and monthly modifications to a data set. A system administrator may have a highest authority level. Accordingly, the system may display for the system administrator all of the daily, weekly, and monthly time windows as options for selection by the administrator for modifying the data set. Another entity in an enterprise may have a medium authority level. When the entity having the medium authority level initiates a request to modify the data set at a future time, the system may display the weekly and monthly data set modification windows as selectable user interface icons. The system may refrain from displaying the daily data set modification windows as selectable user interface icons.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a hierarchal data interface engine 120. A client 110 interacts with the hierarchal data interface engine 120 to access data in the data repository 130. The data includes hierarchal data structures 131, or applications, associated with one or more data sets (data set A-data set N) 133a-133n. The data sets 133a-133n may include overlapping data among two or more data sets. A data set 133a may include first data that is included another data set 133n. The data set 133a may include second data that is excluded from the other data set 133n. The data sets 133a-133n may be subsets of a single data set. For example, all enterprise data may comprise a single data set. The subsets of enterprise data accessed by different applications 131 associated with different individuals in the enterprise may comprise subsets of the single data set. According to one example, an application 131a associated with a first department in an enterprise defines a first hierarchal data structure 132 comprising a set of nodes 132a-132n. The first hierarchal data structure 132 is associated with a first data set 133a among the data sets 133a-133n. For example, the first department may be "human resources," and the set of nodes in the hierarchal data structure 132 may correspond to sets of data accessed by the application 131a to populate a graphical user interface (GUI) used by employees of the department "human resources." A second application 131b associated with another department ("sales") includes a different hierarchal data structure made up of different nodes than those represented in the first application 131a. The second application 131b is associated with another data set 133b different from the data set 133a. Although the second application 131b is associated with another data set 133b different from the data set 133a, one or more nodes may be the same in the hierarchal data structures of the applications 131a and 131b. A third application 131c associated with another department ("Manufacturing") includes a different hierarchal data structure made up of different nodes than those represented in the first application 131a and the second application 131b.

Each node 132a-132n in the hierarchal data structure 132 is a data structure of a particular type representing a particular entity. Examples of entities include "employee," "customer," "account," "cost center," and "city." An example of a hierarchy includes a "product line" type parent node, two "product"-type child nodes, a separate "product development team" and "sales team"-type child node for each "product"-type node, and "employee"-type nodes for each "product development team" and "sales team"-type node. Each node is defined by a set of node properties. For example, an "employee" type node may include node properties: "employee name," "employee class." "employee title," "salary." "residence." "contact information," "supervisor," and "department." As another example, a node-type "product" may include node properties: "product name," "product type," "manufacturing group," "marketing group," and "development group."

The different hierarchal data structures 132 of the different applications 131a-131c may include: one hierarchal data structure having a node that another hierarchal data structure does not; different hierarchal data structures having the same nodes in different positions within the hierarchal data structures (such as depending from different parent nodes, or being a parent to different children nodes); and one hierarchal data structure having multiple instances of a node while another hierarchal data structure has only one instance of the node (or fewer instances of the node).

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the hierarchal data interface engine 120. Alternatively, or additionally, a data repository 130 may be implemented or executed on a computing system separate from the hierarchal data interface engine 120. A data repository 130 may be communicatively coupled to the hierarchal data interface engine 120 via a direct connection or via a network.

Information describing applications 131, hierarchal data structures 132, and data sets 133 may be implemented across any of components within the system 100. However, this information is illustrated within the data repository 104 for purposes of clarity and explanation.

The hierarchal data interface engine 120 includes an interface 121. The interface 121 provides functionality for the client 110 to access the data in the data repository 130.

In one or more embodiments, interface 121 refers to hardware and/or software configured to facilitate communications between a user or the client 110 and the hierarchal data interface engine 120. Interface 121 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 121 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 121 is specified in one or more other languages, such as Java, C, or C++.

For example, the interface 121 may provide data to the client 110 to render graphics, such as application pages and web pages associated with an application 131 on the client 110. Data fields and other elements of the rendered graphics may be populated based on nodes and node properties of the hierarchal data structures 132. For example, the interface 121 may generate GUI content to display node properties comprising employee data associated with a node of a type "employee."

The data set modification engine 122 provides functionality to allow users and clients 110 to modify data in the data sets 133a-133n. The data set modification engine 122 includes a data modification request scheduler. Users, or clients 110, modify the data set 133 may generating a request. For example, a user may generate a request indicating that the user would like to modify node 132a to change a node property value from one value to another. In addition, the user may generate a request to move a node within a node hierarchy, add a node to a node hierarchy, delete a node, or modify a node.

In one or more embodiments, the data set modification engine 122 allows users to schedule requests to modify nodes at one or more predetermined future times. For example, an administrator may schedule a weekly update to a particular data set. Organization members may generate requests that are stored in a time window associated with the time of the weekly update. For example, one organization member may schedule a node modification request in a first time window associated with the first weekly update on Sunday of week 1. Another organization member may schedule a node modification request in another time window associated with a second weekly update on Sunday of week 2. The organization members may not be able to schedule requests in a time window between the first time window and the second time window, such as from Monday to Saturday.

The data set modification engine 122 includes a future state generator 124 to generate a representation of a future state of a data set. For example, when a user selects a user interface element in a GUI of the user interface 121 associated with a time window one month in the future, the future state generator 124 generates a representation of the state of an associated data set one month in the future. The representation of the state of the data set one month in the future includes the current state of the data set, at a present time, and any modifications to the data set scheduled between the present time and the time window one month in the future.

The data set modification engine 122 includes data modification request rules 125. Data modification request rules 125 may specify: which users are permitted to generate requests to modify particular data sets, when particular users are permitted to schedule requests to modify particular data sets (e.g., which future time windows are provided to users as selectable options when requests to modify a data set may be scheduled), and how potential conflicts between scheduled requests are resolved.

The data set modification engine 122 includes a data modification requests analysis engine 126. The data modification request analysis engine 126 analyzes a data modification request received by a user and determines whether the request would result in a conflict with any other request. For example, the data modification request analysis engine 126 may analyze a request received in a time window associated with week 3 and determine, (a) whether the request would affect any requests scheduled for a time window subsequent to week 3 (e.g., weeks 4, 5, 6, etc.), or (b) whether the request would affect, or be affected by, any requests scheduled for time windows associated with weeks 1 or 2.

A remediation engine 127 performs remediation actions based on determining that a request would conflict with another request. Examples of remediation actions include: (a) changing an order in which requests are scheduled in a same time window, (b) notifying an owner of a requests that the request cannot be performed, (c) notifying an owner of a request that the request would create a conflict with one or more additional requests, and (d) modifying or deleting one or more requests based on detecting a conflict.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the hierarchal data interface engine 120 refers to hardware and/or software configured to perform operations described herein for modifying nodes in hierarchal data structures. Examples of operations for modifying nodes in hierarchal data structures are described below with reference to FIG. 2.

In an embodiment, the hierarchal data interface engine 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the client 110 may represent a tenant, and the system may include multiple separate tenants. A tenant is a corporation, organization, enterprise or other entity that accesses a shared computing resource, such as the hierarchal data interface engine 120 and data sets 133a-133n. In an embodiment, tenants are independent from each other. A business or operation of one tenant is separate from the business or operations of another tenant.

3. Managing Requests for Future Modifications to a Dataset

Figure 2:
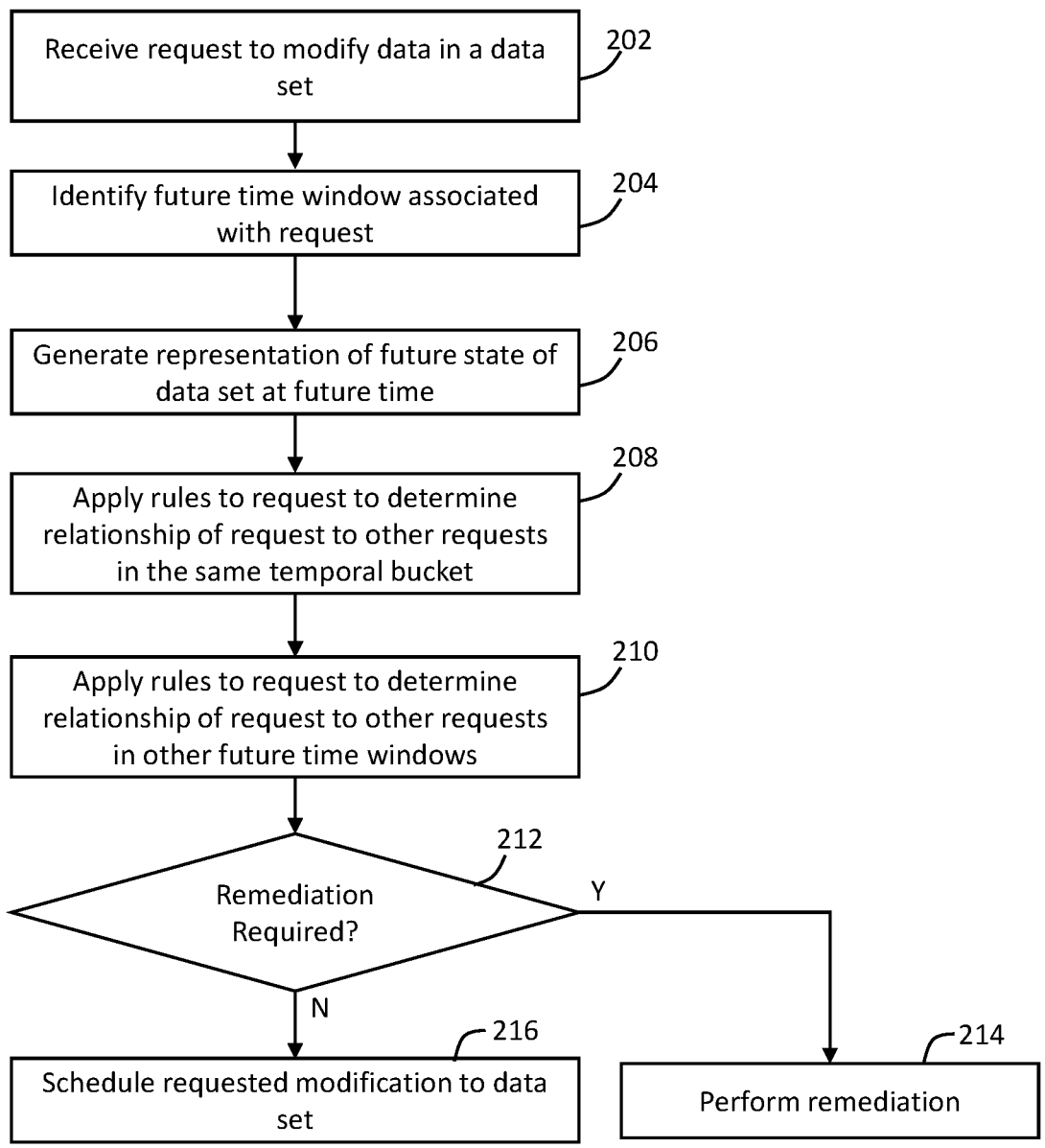
FIG. 2 illustrates an example set of operations for processing requests to modify a future state of a dataset in accordance with one or more embodiments.

FIG. 2 illustrates an example set of operations for managing requests for future modifications to a data set in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a request to modify data in a data set (Operation 202). The request includes a time window in which the requested modification is to be implemented in the data set and the type of modification to the data set associated with the request. In one embodiment, the system displays a graphical user interface (GUI) including a set of time windows selectable by a user to schedule modifications to a data set. The system may analyze an authorization level of a user to determine a subset of future time windows, from among a set of all future time windows, to display to the user. The system may determine in which future time windows the user is permitted to schedule modifications to the data set based on the user's authorization level.

The system identifies a future time window associated with the request (Operation 204). For example, the system may determine that a user has selected a particular time window three weeks in the future to schedule a requested modification to the data set. In one or more embodiments, the system allows modifications to a data set within defined time windows. The system may prevent modifications to the data set outside the defined time windows. For example, the system may present to an entity generating a data set modification request a set of time windows associated with a particular day each week. The entity may be permitted to schedule requests to modify the data set during the defined time windows. The entity may be prevented from scheduling requests to modify the data set at other times other than the defined time windows.

In one or more embodiments, the system allows certain modifications at times other than the defined time windows. The system may prevent other modifications at the times other than the defined time windows. For example, the system may allow generating requests to schedule modifications to node property values of nodes of a hierarchal data structure set at times outside defined time windows. However, the system may prevent generating requests to schedule modifications to a hierarchal data structure, such as moving or deleting nodes, at the times outside the defined time windows.

The system generates a representation of the future state of the data set at the future time associated with the selected window of time (Operation 206). The future state of the data set is generated based on (a) the current state of the data set, and (b) any modifications to the data set scheduled to be performed between the present time and the selected future window of time. For example, if a user requests to modify the data set at a window of time three weeks in the future, the system may generate a representation of the future state of the data set based on the present state of the data set and based on any scheduled modifications to the data set from the present time to the time window three weeks in the future.

According to one embodiment, generating a representation of the future state of the data set includes generating a visual representation via the GUI of the data set. For example, the system may display a set of nodes (such as a hierarchal data structure 132 illustrated in FIG. 1) associated with the future state of the data set. According to one example, if the present state of the data set includes a hierarchy of nodes including ten nodes, and if modifications scheduled to occur between the present time and a selected time window include the deletion of two nodes, then the generated representation of the future state of the data set would include eight nodes that are selectable and modifiable by a user. The two nodes that are scheduled to be deleted between the present time and a selected time window are not displayed in the display of the future state of the data set.

The system applies a set of rules to the request to determine a relationship of the request to any other requests that are scheduled in the same window of time (Operation 208). For example, the request may be scheduled for a window of time three weeks in the future. The system may determine that another modification was previously scheduled in the same window of time three weeks in the future. The system applies the set of rules to the request to determine (a) whether a conflict exists between the requests in the same time window, and (b) in which order the requests should be performed.

For example, the system may identify a previously-scheduled request to modify a particular node in a data set in a particular future window of time. The system may determine that the present request includes a request to modify the same node. The system may further determine that the requests conflict. For example, the earlier-generated request may be a request to delete the node, and the later-generated request may be a request to modify the node.

The rules for determining an order in which the requests are scheduled in the same future time window may include: (a) a rule to schedule requests in the order they are received, (b) a rule to give requests of particular types of modifications higher priority than others, and (c) a rule to schedule requests in an order according to an authority level of an entity requesting the modification. For example, an administrator may be assigned a higher priority than another employ. Accordingly, a request generated by an administrator may be arranged earlier than the request by the other employee, even if the administrator generated a request later than the other employee generated a request.

The system applies another set of rules to the request to determine a relationship of the request to other requests in other future time windows (Operation 210). For example, the system may determine whether a request scheduled for a particular future time window is associated with modifying a node that is created, deleted, or modified by a request in another future time window. The system may identify nodes of a data set associated with future time windows occurring prior to a selected time window. For example, a requestor may request to modify a data set at a date 3 weeks in the future. The system may determine whether the requested modification is related to any modifications scheduled 2 weeks in the future. According to one embodiment, the system may be configured to generate a notification to a requestor of a modification to the data set scheduled 2 weeks in the future in the event another requestor requests a modification to a same node or nodes at a later date in the future.

The system may identify nodes of the data set associated with future time windows occurring subsequent to the selected future time window. For example, when the requestor requests to schedule a modification to the data set at a date 3 weeks in the future, the system may determine whether the requested modification is related to any modifications scheduled 4 weeks in the future.

Based on determining the relationship between the request and any requests in the same future time window or other future time windows, the system determines whether to perform a remediation action (Operation 212). The system may determine that remediation is required when a presently-generated request creates a conflict with a previously-generated request, either in the same time window or a different time window. For example, if two requests for future modifications to the data set conflict, the system may determine that remedial action is required. In addition, if one requests for a modification to a data set affects another, the system may determine that remedial action is required, even if the modifications associated with both requests could be performed. For example, a user may generate a first request to modify a data set. The first request may be scheduled for first future window of time and may change a node property value. Another user may have previously scheduled a second request. The second request may be scheduled for a second future window of time occurring later than the first future window of time. The second request may use the data modified by the first request to generate a particular node property value. Even though the second request could be performed without conflicting with the first request, the system may determine that, since the first requests affects the result of the second request, a remedial action may be required.

Remediation actions include, for example, generating a notification to one or more entities associated with one or more requests, refraining from scheduling a presently-requested future modification, canceling a previously-scheduled future modification, changing an order in which requests for future modifications are scheduled, and modifying one or more requests for future modifications.

According to one or more embodiments, subsequent to scheduling a modification to a data set at a future time, the system monitors operations being executed and/or a state of a data set to ensure that the operations and/or state of the data set do not conflict with modifications already scheduled for a future time. For example, the system may store a modification to a particular database record to be executed in three weeks. An application, executed by the system, may delete the particular database record. In response to the deletion, the system determines that the scheduled modification, to be executed in three weeks, can no longer be executed.

If the system determines that one or more remedial actions are required (Operation 212), the system performs the remedial actions (Operation 214). For example, according to one embodiment, the system notifies one or more entities associated with one or more scheduled requests to modify a data set that a request has been scheduled that affects the previously-scheduled requests. For example, the notification may indicate that the recently-scheduled request for a future modification would affect or modify another previously-scheduled request for a future modification to the data set. The notification may inform an entity that a previously-scheduled request may no longer be performed. The notification may inform an entity that a previously-scheduled request will be affected by a later-scheduled request.

According to one or more embodiments, the remediation action includes refraining from performing a modification to a data set associated with a request. For example, the system may inform a presently-requesting entity that the request cannot be scheduled due to a conflict with a previously-scheduled request. The previously-scheduled request may be a request associated with either a(n) (a) earlier-occurring future window of time, or (b) a later-occurring future window of time. For example, a present request may be associated with a window of time that will occur in three weeks. The system may determine that the present request conflicts with another request scheduled for a future window of time that will occur in two weeks. Alternatively, or in addition, the system may determine that the present request conflicts with another request scheduled for a future window of time that will occur in four weeks. Based on the identified conflict, the system may select the present request to be performed, and the system may cancel scheduling of the previously-scheduled request. Alternatively, the system may maintain scheduled the previously-scheduled request and may refrain from scheduling the present request.

In one or more embodiments, the system applies a set of rules to the request to determine a remediation action to apply to the request or other requests. According to one example, the system applies a rule to give earlier-generate requests priority over later-generated requests, when both requests are directed to the same future data modification window. According to another example, the system applies a rule to determine an authority level of an entity initiating the requests. The system may give priority to the request generated by the entity having the higher authority level. According to yet another example, the system may apply a rule that determines which request affects more additional requests. For example, if one request conflicts with only one other request, but if another requests conflict with three other requests, the system may schedule, or keep scheduled, the former request and may generate a notification to the entity associated with the latter request that the request cannot be scheduled.

If the system determines that a remediation action is not required, the system schedules the requested modification to the data set in the selected future time window (Operation 216).

4. Managing Access to Future Dataset Modification Windows

According to one or more embodiments, the system displays a subset of future data set modification windows, from among a superset of future data set modification windows, according to an authority level of an entity initiating a request to modify a data set at a future time. For example, the system may include future data set modification windows for daily, weekly, and monthly modifications to a data set. An entity initiating a request may be provided with access to a different set of the future data set modification windows based on the authority level of the user. A system administrator may have a highest authority level. Accordingly, the system may display for the system administrator all of the daily, weekly, and monthly time windows as options for selection by the administrator for modifying the data set. Another entity in an enterprise may have a medium authority level. When the entity having the medium authority level initiates a request to modify the data set at a future time, the system may display the weekly and monthly data set modification windows as selectable user interface icons. The system may refrain from displaying the daily data set modification windows as selectable user interface icons. Another entity in the enterprise may have a low authority level. When the entity having the low authority level initiates a request to modify the data set at a future time, the system may display the monthly data set modification windows as selectable user interface icons. The system may refrain from displaying the daily and weekly data set modification windows as selectable icons.

5. Queing Requests in Time-Independent Request Queues

According to one or more embodiments, the system may queue one or more requests in a time-independent request queue. When an entity selects the time-independent request queue for scheduling requests, the system generates a future state of the data set based on (a) the current state of the data set, and (b) any previously-scheduled requests in the same time-independent request queue. For example, a time-independent request queue named "Acquisition of Company X" may store requests to modify the data set that would be required in the event the enterprise acquired company X. The time-independent request queue is not scheduled to be executed. The requests queued in the time-independent request queue are not scheduled to be implemented. Instead, the system generates a future state of a data set for the time-independent request queue based on the passage of time. For example, the time-independent request queue may include three requests to modify a data set. At a present time 1, performance of the three requests would result in a first data set structure. If an entity selects the time-independent request queue at the present time 1, the system may generate the future state associated with the data set based on the state of the data set at the present time 1 and based on the modifications associated with the three queued requests. With the passage of time, the data set may be modified. Accordingly, if an entity selects the time-independent request queue at a present time 2, which is a time later than the present time 1, the system may generate the future state associated with the data set based on the state of the data set at the present time 2 and based on the modifications associated with the three queued requests.

In addition, with the passage of time, as the data set is modified by requests, one or more requests in the time-independent request queue may conflict with a present state of the data set. Accordingly, the system may generate a notification based on a detected conflict. The requests queued in the time-independent request queue do not take into account requests in future time windows. Accordingly, the system may refrain from analyzing relationships between requests stored in the time-independent request queue and future time windows to identify potential data modification conflicts. In addition, requests queued in the time-independent request queue do not take into account requests in other time-independent request queues. The system may generate a separate future state of a data set for each separate time-independent request queue based on the present state of the data set and based on the separate requests queued in the separate time-independent request queues.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
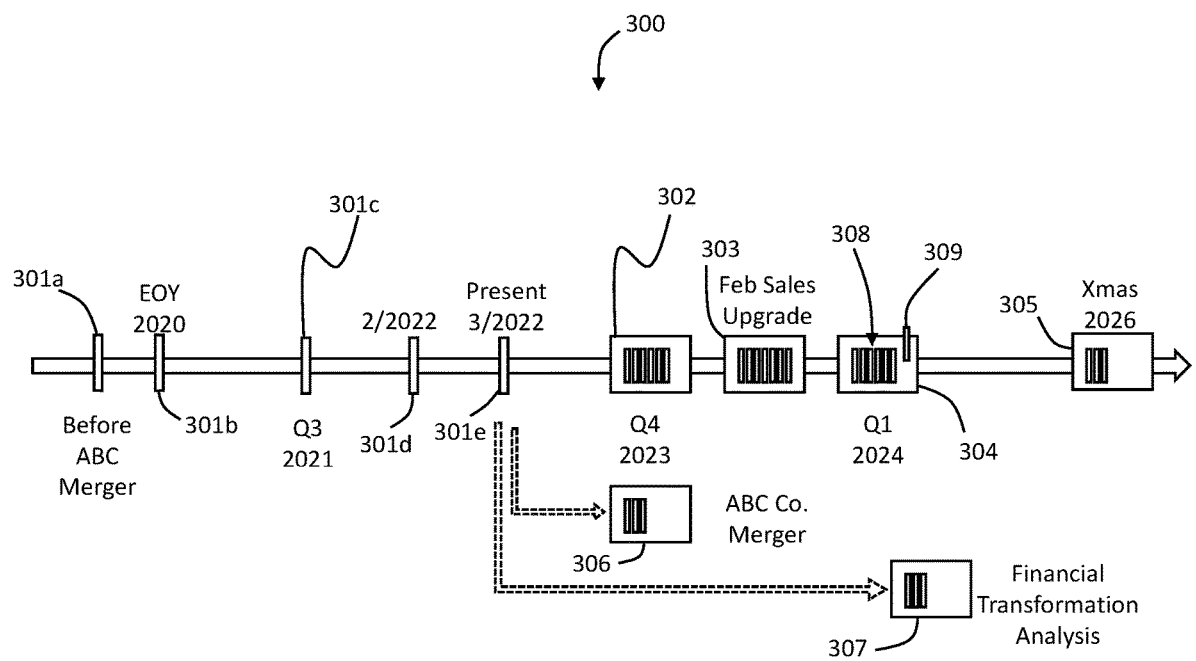
FIGS. 3A-3D illustrate an example embodiment of a graphical user interface (GUI) for scheduling requests to a data set.

FIGS. 3A-3D illustrate a timeline graphical user interface (GUI) 300. According to one or more embodiments, scheduled and/or proposed modifications to a data set may be represented as elements on the timeline GUI 300 (also referred to as timeline 300). FIG. 3A illustrates a timeline 300 including bounded windows of time 302, 303, 304, and 305 representing moments or periods of time in the future, relative to a "present time," or a time at which the timeline 300 is being viewed by a user. The bounded windows of time 302-305 are selectable by an entity, such as a user or administrator, as times at which a user may schedule a requested modification to a data set. Accordingly, the time windows 302-305 are associated with request queues, or sets of scheduled requests to modify the data set.

For example, an administrator may generate a "Q4 2023" time window 302 to implement scheduled modifications to a data set on the last day of the fourth quarter of the year 2023. Likewise, the administrator may generate a "Q1 2024" time window 304 to implement scheduled modifications to the data set on the last day of the first quarter of the year 2024. The administrator may generate additional time windows, such as "February Sales Upgrade" (303) to update a data set associated with a sales organization in an enterprise and "Xmas 2026" (305) associated with an update to the data set to be implemented on Christmas of the year 2026.

An entity in an enterprise may select the pre-generated windows of time 302-305 to request modifications to the subset of the data set at those particular times. The entity in the enterprise may be prevented from modifying the subset of the data set at times outside the pre-generated windows of time. For example, an information technology employee may schedule data updates, such as adding, removing, and modifying application data, at time periods associated with the end of the fourth quarter of 2023 (302), or the end of the first quarter of 2024 (304). The computer system may further prevent the information technology employee from scheduling any data updates at any times outside the designated windows 302-305.

According to one embodiment, employees may be prevented from scheduling modifications to a data set associated with the sales organization at an enterprise in the weeks leading up to the "February Sales Upgrade" time window 303. Instead, the employees may schedule any requests to modify the data set associated with the sales organization during the "February Sales Upgrade" time window 303. The requests may form a queue in the "February Sales Upgrade" time window 303. The system determines the order of requests in the queue by applying a set of rules to the requests. For example, the system may implement a rule that requests are queued in the order they are generated.

In the embodiment illustrated in FIGS. 3A-3D, each window 302-305 is associated with a set of requests to update or modify a data set. For example, a set of requests 308 is associated with the window 304. Upon generating, by a user, a request to modify the data set, the system adds a user interface element 309 representing the generated request. The system adds the request 309 to the set of requests 308 in the window 304. The system applies a set of rules to the request 309 to determine whether to include the request 309 in the set of requests 308. In addition, the system applies the set of rules to the request 309 to determine in which order to place the request 309 among the set of requests 308. In the example illustrated in FIG. 3A, the system places the request 309 at a last position among the set of requests 308. When the system executes the set of modifications to the data set represented by set of requests 308, the system executes the requests in order from first-to-last. In other words, the system sequentially executes each request of the set of requests 308 prior to executing the request 309. If another request is generated by a user, the system may place the newer requests after the request 309, which has been added to the set of requests 308.

According to one embodiment, selection of a window 302-305 by a user causes the computer system to generate another GUI of a representation of a data set. For example, a data set may be represented as a hierarchy of nodes, as illustrated by the hierarchal data structure 132 of FIG. 1. Requests in a particular window, such as the window 304, may add, delete, or alter the nodes in the data set. When a user selects a particular window 302-305 in which to include a data set modification request, the system may generate a representation of the data set in which each request already included in the window has been implemented. For example, if a first request deletes a node, a second request adds a node, and a third request changes a position of a node in a hierarchal data structure, the system may display for the user initiating a new request a representation of the hierarchal data structure as it will look when the first, second, and third requests have already been executed. Similarly, the system may display a hierarchal data structure as it will look when any other time window preceding the selected time window has been executed. For example, if a user selects the time window 304 in which to add a new request to modify a data set, the system may display for the user a representation of a hierarchal data structure in which the requests associated with the time windows 302 and 303 have been executed, and in which the requests of the set of request 308 have been executed.

As illustrated in the example of FIG. 3A, the system inserts newest requests at the end of a set of requests. However, in alternative embodiments, the system applies rules to insert new requests before one or more previously-generated requests. For example, the system may determine that a request has a higher authority level than previously-generated requests.

According to an embodiment, the system analyzes permissions associated with a user generating a request to determine (a) whether to allow the user to execute a selected request in a selected window of time, and/or (b) in which windows of time the user is permitted to generate requests. For example, the system may determine that an information technology employee lacks authorization to schedule a data update during the February sales upgrade (303). However, the system may determine that the same information technology employee is authorized to schedule a data update in the windows 302 or 304. Accordingly, the system prevents the IT employee from selecting the window 303 to schedule a request to modify a data set. The system permits the IT employee to select the windows 302 and 304 to schedule requests to modify the data set.

Figure 3B:
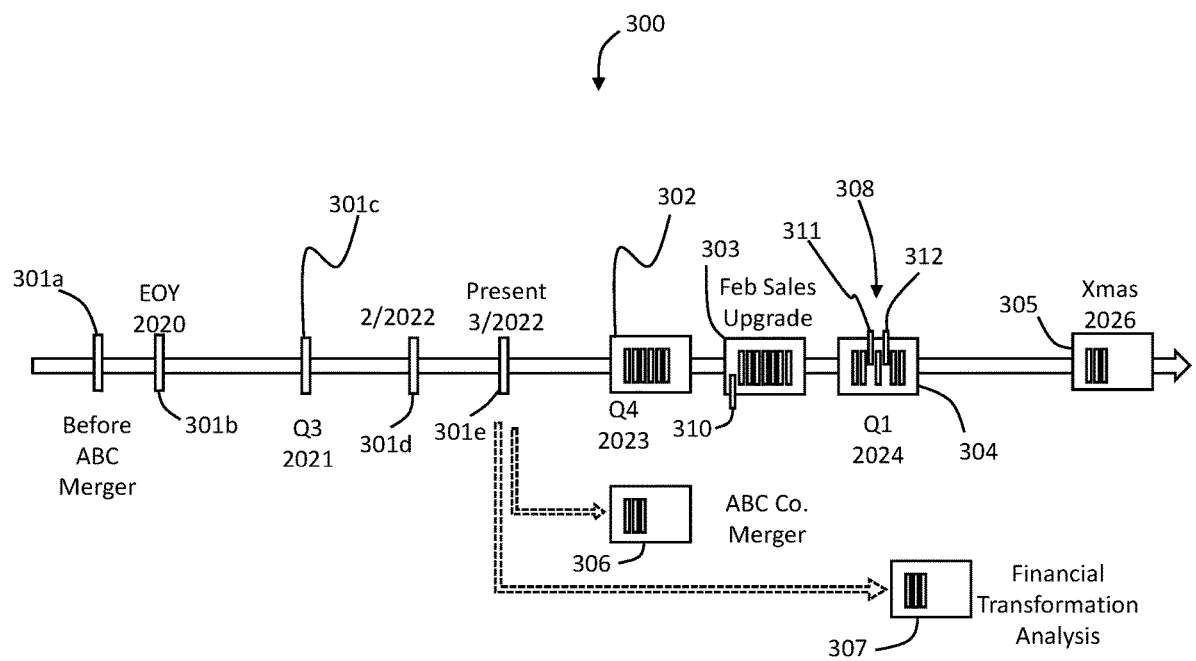

As illustrated in FIG. 3B, a system applies a set of rules to resolve potential conflicts to a data set. For example, a user may generate a request 310 to modify the data set during an update window 303 associated with a "February Sales Upgrade." The system may determine that the request 310 modifies one or more data structures that are also modified by the requests 311 and 312. The requests 311 and 312 were generated prior to the request 310. However, the requests 311 and 312 are associated with a time window 304 that is later on the timeline 300 than the time window 303. In other words, even though the requests 311 and 312 were generated prior to the request 310, the modifications to the data set specified in the requests 311 and 312 would be performed subsequent to the modifications specified in the request 310. Based on detecting a conflict among requests, the system applies a set of rules to resolve the conflict. For example, a rule may specify that a request included in an earlier time window takes precedence over a request included in a later time window. Applying this rule, the system would allow the request 310 to be included in the time window 303. The system would further perform remediation operations associated with the requests 311 and 312. For example, the system may perform one or more of: (a) deleting the requests 311 and 312, (b) generating a notification to an owner of the requests 311 and 312 alerting the owner that the requests can no longer be completed, (c) modify the requests to omit portions of the requests that conflict with the request 310, and (d) generate a notification to an owner of the request 310 to alert the owner to the conflicting requests.

According to an example embodiment, the set of rules resolves conflicts based on priority levels associated with one or more of: (a) an owner of a request, (b) an entity associated with a request, and (c) a type of modification specified in a request. For example, the system may identify a user generating the request 310 as a system administrator. The system may identify a user associated with the request 311 as an employee having a lower priority level than the system administrator. Based on determining that the system administrator has a higher priority level than the employee, the system may apply a rule to (a) include the request 310 in the time window 303, (b) remove the request 311 from the time window 304, and (c) generate a notification to inform the employee that the request 311 can no longer be executed. As another example, the system may identify the request 311 as being a critical update and the request 310 as being a non-critical modification of data. The system may apply a rule specifying critical updates as having higher priority than non-critical updates. The system may further apply a rule specifying that when a newly-generate request having a lower priority conflicts with a previously-generate request having a higher priority, the newly-generated request may not be implemented. The system may prevent a user from associating the request 310 with the window 303. For example, the system may display accepted requests as being located entirely within the window 303. The system may display rejected requests, or requests requiring user attention, as at least partially outside the window 303. The system may visually distinguish the request 310 from the other requests that have been included in the window 303. For example, rejected requests may be displayed in a different color, with an alert-type icon, or in a different position relative to the window 303 than other requests.

As illustrated in FIG. 3A, a timeline 300 may include time-independent request queues 306 and 307. When an entity selects the one of the time windows 306 or 307 for scheduling requests, the system generates a future state of the data set based on (a) the current state of the data set (e.g., the state of the data set at the time the user is generating requests, represented by "Present 3/2022" 301e in FIG. 3A), and (b) any previously-scheduled requests in the same time-independent request queue. For example, the time-independent request queue or time window 306 named "ABC Co. Merger" may store requests to modify the data set that would be required in the event an enterprise associated with the timeline 300 acquired company ABC Co. The time-independent request queue or time window 306 is not scheduled to be executed. Instead, the system generates a future state of a data set for the time-independent request queue 306 based on the passage of time. For example, the time-independent request queue may include three requests to modify a data set. At the present time 301e illustrated in FIG. 3A, corresponding to March of 2022, performance of the three requests would result in a first data set structure. If an entity selects the time-independent request queue 306 at the present time 301e, the system may generate the future state associated with the data set based on the state of the data set at the present time 301e and based on the modifications associated with the three queued requests.

Figure 3C:
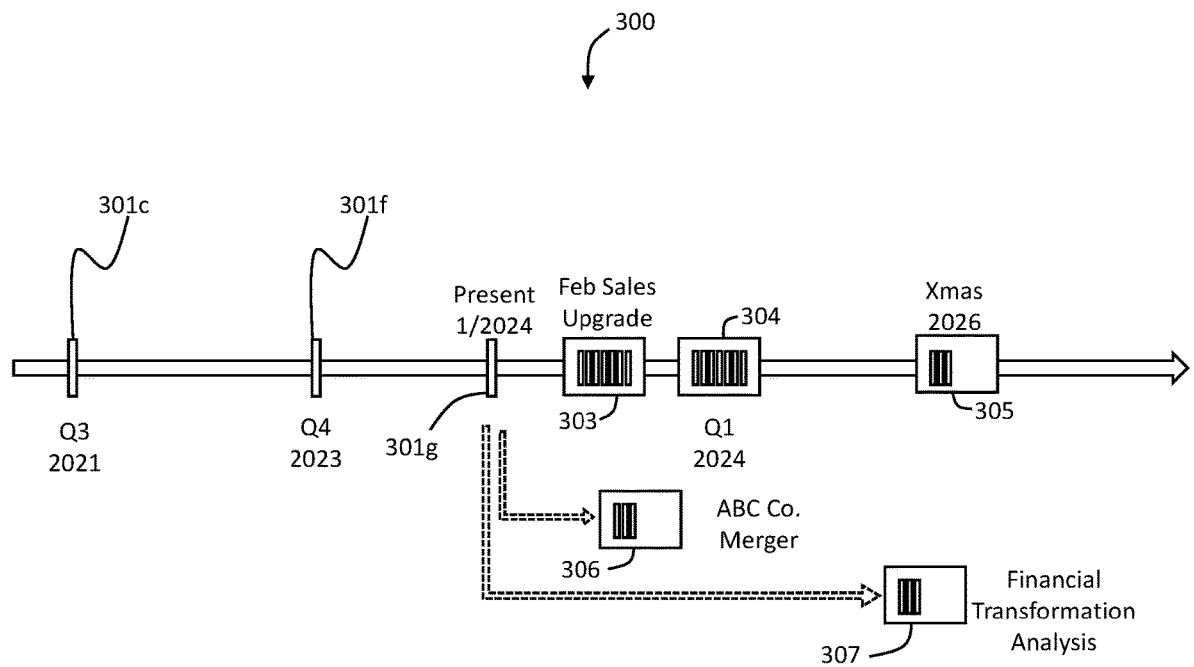

As illustrated in FIG. 3C, with the passage of time, the data set may be modified. FIG. 3C represents a present time 301g associated with January 2024. The data set in the present time 301g has been modified based on the requests in the request queue 302 "Q4 2023." Accordingly, if an entity selects the time-independent request queue at a present time 301g, which is a time later than the present time 301e, the system may generate the future state associated with the data set based on the state of the data set at the present time 301g (January 2024) and based on the modifications associated with the three queued requests in the request queue in the time window 306 "ABC Co. Merger."

With the passage of time, the system executes request in time windows 302, 303, 304, and 305. As the system executes a set of requests to modify the data set, the system determines whether one or more requests in the time independent request queues 306 and 307 conflict with the newly-modified data set. For example, at the present time 301e corresponding to March 2022, the system may detect no conflicts between the time-independent data queues and the present state of the data set. For example, if the requests included in the window 306 modify three nodes of a hierarchal data structure, the system may determine that the modifications to the three nodes are capable of being performed based on the present state of the hierarchal data structure. With the passage of time, as represented by FIG. 3C, the system may execute the requests in the window 302, modifying the hierarchal data structure. One of the requests may delete a node that would be modified by a request in the time-independent requests queue 306. Accordingly, the system generates an alert to a user associated with the window 306 that one or more of the requests to modify the data set is no longer valid.

According to one embodiment, the system may permit an authorized user to convert a time-independent request queue into a time-dependent request queue. The system may display a user interface element to allow a user to select a time for executing the time-independent request queue. For example, a time-independent request queue may remain independent and un-executed with the passage of time. The system may update a future state of the data set with the passage of time to correspond to (a) a present state of the data set and (b) any requests in the time-independent request queue. A user may select a user interface element in the GUI to implement the time-independent request queue at a particular time. For example, the user may select to execute the requests queue associated with the window 306 at a time "Q2 2024." Upon selection of a time "Q2 2024" by the user, the system may position the window 306 along the timeline between the windows 304 and 305. The system may further check for any conflicts between the requests in the window 306 and the future windows 303 and 304 which would be executed prior to the window 306 executed at "Q2 2024."

Figure 3D:
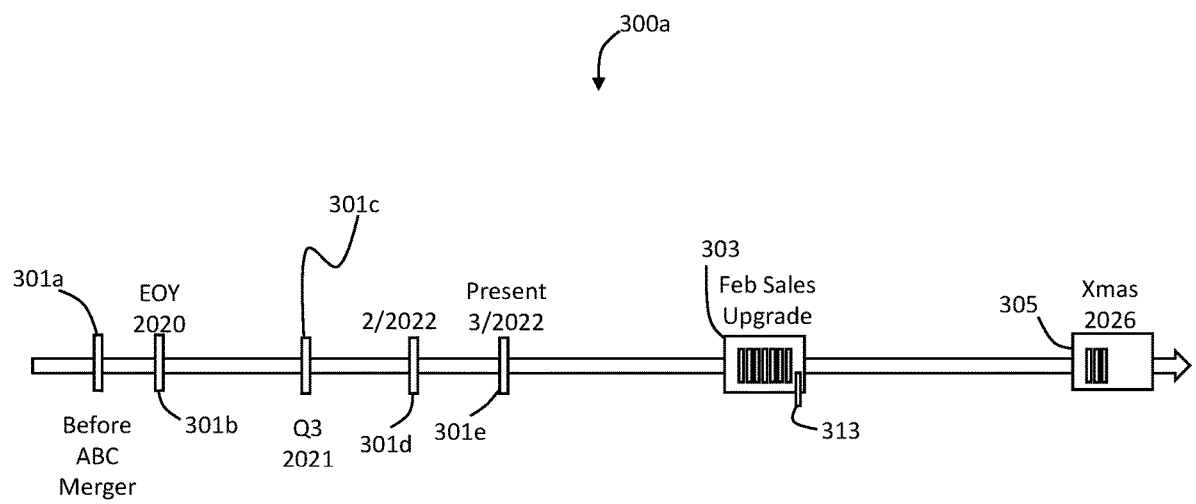

The requests queued in the time-independent request queues 306 and 307 do not take into account requests in future time windows 302, 303, 304, or 305. Accordingly, the system does not analyze relationships between requests stored in the time-independent request queues 306 and 307 and future time windows 302-305 to identify potential data modification conflicts. In addition, requests queued in the time-independent request queues 306 and 307 do not take into account requests in other time-independent request queues. For example, the system does not determine whether requests in the window 306 conflict with requests in the window 307. The system may generate a separate future state of a data set for each separate time-independent request queue based on the present state of the data set and based on the separate requests queued in the separate time-independent request queues The system may selectively display time windows for scheduling requests to modify a data set at a future time according to an authority level of a requestor. For example, FIG. 3A illustrates a GUI of a timeline 300 displayed for a database administrator. The database administrator may have a high authority level. Accordingly, the database administrator may be authorized to schedule requests in each of the time windows 302-305. In addition, the database administrator may be authorized to generate requests in the windows 306 and 307 associated with time-independent request queues. In contrast, FIG. 3D illustrates a GUI 300a displayed for an employee having a lower authorization level than the system administrator. The employee is authorized to generate a request 313 in the future time window 303 associated with the "February Sales Upgrade" or the future time window 305 associated with "Christmas 2026."

Since the employee is not authorized to generate requests in the future time windows 302 or 304, the system does not display these future time windows in the GUI. In addition, since the employee is not authorized to generate a request in the time-independent windows 306 and 307, the system does not display these time windows in the GUI.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
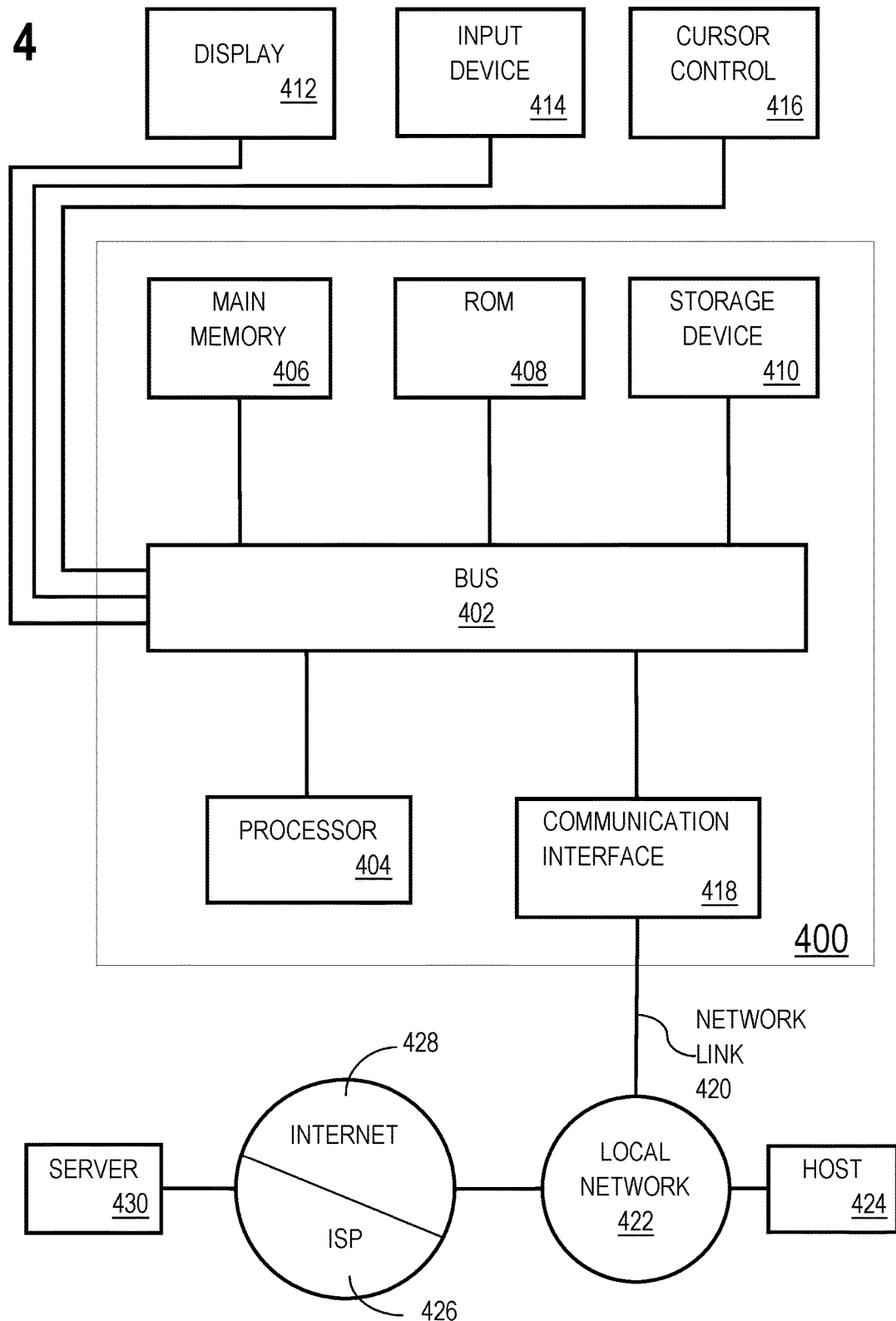
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
    receiving (a) a first request to perform a first database transaction for modifying a database record, and (b) a selection of a first future time at which to perform the first database transaction for modifying the database record;
    storing the first request to perform the first database transaction at the first future time;
    receiving (b) a second request to perform a second database transaction for modifying the database record, and (b) a selection of a second future time at which to perform the second database transaction for modifying the database record, wherein the first future time is prior to the second future time;
    determining a future state of the database record at the second future time at least by:
        querying a database, comprising the database record, to identify one or more future database transactions for modifying the database record that are to be executed at respective one or more future times prior to the second future time, the one or more future database transactions comprising the first database transaction to be executed at the first future time that is prior to the second future time;
        executing the one or more future database transactions on a copy of a current state of the database record to determine the future state of the database record at the second future time;
    determining, in real-time and in response to receiving the second request to perform the second database transaction, whether the second database transaction specified in the second request conflicts with the future state of the database record at the second future time;
    determining that the second database transaction specified in the second request conflicts with the future state of the database record at the second future time;
    based on determining that the second database transaction specified in the second request conflicts with the future state of the database record: applying a set of conflict remediation rules to the first request and/or the second request to perform a remediation action corresponding to at least one of the first request and the second request;
    wherein the remediation action comprises at least one of:
        (a) discarding the first database transaction without executing the first database transaction on the database record at the first future time, wherein the second database transaction is executed at the second future time;
        (b) discarding the second database transaction without executing the second database transaction on the database record at the second future time, wherein the first database transaction is executed at the first future time;
        (c) modifying the first database transaction to generate a modified first database transaction such that the second database transaction no longer conflicts with the future state of the database record that is based at least in part on the modified first database transaction, wherein the modified first database transaction is executed at the first future time and the second database transaction is executed at the second future time;
        (d) modifying the second database transaction to generate a modified second database transaction such that the modified second database transaction does not conflict with the future state of the database record at the second future time, wherein the first database transaction is executed at the first future time and the modified second database transaction is executed at the second future time.

2. The non-transitory computer readable medium of claim 1, the operations further comprising:
    wherein performing the remediation action comprises:
        generating a notification to an entity associated with at least one of the first database transaction and the second database transaction; and
        responsive to the notification, receiving a selection to perform at least one of: discarding the first database transaction or the second database transaction, or modifying the first database transaction or the second database transaction.

3. The non-transitory computer readable medium of claim 1, wherein
    applying the set of conflict remediation rules comprises:
    determining that the second future time is after the first future time; and
    discarding the second database transaction based on determining the second future time is after the first future time.

4. The non-transitory computer readable medium of claim 1, the operations further comprising:
    prior to receiving the second request:
        presenting, in a graphical user interface (GUI), a representation of the future state of the data set, wherein the second request is based on the future state.

5. The non-transitory computer readable medium of claim 1, wherein storing the first request to perform the first database transaction at the first future time comprises storing the first request in a first queue comprising a first set of database transactions to be performed at the first future time,
   wherein the one or more future database transactions includes the first set of database transactions.

6. The non-transitory computer readable medium of claim 5, further comprising:
   storing, in a time-independent queue a second set of database transactions for modifying the database record,
   wherein the one or more future database transactions excludes the second set of database transactions.

7. The non-transitory computer readable medium of claim 6, further comprising:
   determining a candidate state of the database record at least by:
      querying the database to identify the second set of database transactions specified in the time-independent queue; and
      executing the set of candidate database transactions on a copy of the current state of the database record to determine the candidate state of the database record.

8. The non-transitory computer readable medium of claim 6, further comprising:
   determining a first candidate state of the database record at least by:
      querying the database to identify the second set of database transactions specified in the time-independent queue; and
      executing the set of candidate database transactions on a first copy of a first current state of the database record to determine the first candidate state of the database record;
   executing one or more database transactions on a first current state of the database record to generate a second current state of the database record; and
   determining a second candidate state of the database record at least by:
      querying the database to identify the second set of database transactions specified in the time-independent queue; and
      executing the set of candidate database transactions on a second copy of the second current state of the database record to determine the second candidate state of the database record.

9. The non-transitory computer readable medium of claim 1, wherein the first request is received based on presenting in a first graphical user interface (GUI) a first subset of data including the database record,
   wherein the second request is received based on presenting in a second GUI a second subset of data including the database record,
   wherein the first subset of data is different from the second subset of data.

10. The non-transitory computer readable medium of claim 1, wherein the set of conflict remediation rules specify performing the remediation action based on a first priority level associated with the first request and a second priority level associated with the second request.

11. The non-transitory computer readable medium of claim 1, wherein the set of conflict remediation rules specify performing the remediation action based on determining (a) a first number of data modification conflicts associated with executing the first database transaction, and (b) a second number of data modification conflicts associated with executing the second database transaction.

12. A method, comprising:
   receiving (a) a first request to perform a first database transaction for modifying a database record, and (b) a selection of a first future time at which to perform the first database transaction for modifying the database record;
   storing the first request to perform the first database transaction at the first future time;
   receiving (b) a second request to perform a second of database transaction for modifying the database record, and (b) a selection of a second future time at which to perform the second database transaction for modifying the database record, wherein the first future time is prior to the second future time;
   determining a future state of the database record at the second future time at least by:
      querying a database, comprising the database record, to identify one or more future database transactions for modifying the database record that are to be executed at respective one or more future times prior to the second future time, the one or more future database transactions comprising the first database transaction to be executed at the first future time that is prior to the second future time;
      executing the one or more future database transactions on a copy of a current state of the database record to determine the future state of the database record at the second future time;
   determining, in real-time and in response to receiving the second request to perform the second database transaction, whether the second database transaction specified in the second request conflicts with the future state of the database record at the second future time;
   determining that the second database transaction specified in the second request conflicts with the future state of the database record at the second future time;
   based on determining that the second database transaction specified in the second request conflicts with the future state of the database record: applying a set of conflict remediation rules to the first request and/or the second request to perform a remediation action corresponding to at least one of the first request and the second request;
   wherein the remediation action comprises at least one of:
      (a) discarding the first database transaction without executing the first database transaction on the database record at the first future time, wherein the second database transaction is executed at the second future time;
      (b) discarding the second database transaction without executing the second database transaction on the database record at the second future time, wherein the first database transaction is executed at the first future time;
      (c) modifying the first database transaction to generate a modified first database transaction such that the second database transaction no longer conflicts with the future state of the database record that is based at least in part on the modified first database transaction, wherein the modified first database transaction is executed at the first future time and the second database transaction is executed at the second future time;
      (d) modifying the second database transaction to generate a modified second database transaction such that the modified second database transaction does not conflict with the future state of the database record at the second future time, wherein the first database transaction is executed at the first future time and the modified second database transaction is executed at the second future time.

13. The method of claim 12,
wherein the performing the remediation action comprises:
generating a notification to an entity associated with at least one of the first database transaction and the second database transaction; and
responsive to the notification, receiving a selection to perform at least one of: discarding the first database transaction or the second database transaction, or modifying the first database transaction or the second database transaction.

14. The method of claim 12, wherein applying the set of conflict remediation rules comprises:
determining that the second future time is after the first future time; and
discarding the second database transaction based on determining the second future time is after the first future time.

15. The method of claim 12, further comprising:
prior to receiving the second request:
presenting, in a graphical user interface (GUI), a representation of the future state of the data set, wherein the second request is based on the future state.

16. A system, comprising:
one or more processors; and
memory storing instructions that, when executed by the one or more processors, cause the system to perform operations comprising:
receiving (a) a first request to perform a first database transaction for modifying a database record, and (b) a selection of a first future time at which to perform the first database transaction for modifying the database record;
storing the first request to perform the first database transaction at the first future time;
receiving (b) a second request to perform a second database transaction for modifying the database record, and (b) a selection of a second future time at which to perform the second database transaction for modifying the database record, wherein the first future time is prior to the second future time;
determining a future state of the database record at the second future time at least by:
querying a database, comprising the database record, to identify one or more future database transactions for modifying the database record that are to be executed at respective one or more future times prior to the second future time, the one or more future database transactions comprising the first database transaction to be executed at the first future time that is prior to the second future time;
executing the one or more future database transactions on a copy of a current state of the database record to determine the future state of the database record at the second future time;
determining, in real-time and in response to receiving the second request to perform the second database transaction, whether the second database transaction specified in the second request conflicts with the future state of the database record at the second future time;
determining that the second database transaction specified in the second request conflicts with the future state of the database record at the second future time;
based on determining that the second database transaction specified in the second request conflicts with the future state of the database record: applying a set of conflict remediation rules to the first request and/or the second request to perform a remediation action corresponding to at least one of the first request and the second request;
wherein the remediation action comprises at least one of:
(a) discarding the first database transaction without executing the first database transaction on the database record at the first future time, wherein the second database transaction is executed at the second future time;
(b) discarding the second database transaction without executing the second database transaction on the database record at the second future time, wherein the first database transaction is executed at the first future time;
(c) modifying the first database transaction to generate a modified first database transaction such that the second database transaction no longer conflicts with the future state of the database record that is based at least in part on the modified first database transaction, wherein the modified first database transaction is executed at the first future time and the second database transaction is executed at the second future time;
(d) modifying the second database transaction to generate a modified second database transaction such that the modified second database transaction does not conflict with the future state of the database record at the second future time, wherein the first database transaction is executed at the first future time and the modified second database transaction is executed at the second future time.

17. The system of claim 16, wherein the performing the remediation action comprises:
generating a notification to an entity associated with at least one of the first database transaction and the second database transaction; and
responsive to the notification, receiving a selection to perform at least one of: discarding the first database transaction or the second database transaction, or modifying the first database transaction or the second database transaction.

18. The system of claim 16, wherein applying the set of conflict remediation rules comprises:
determining that the second future time is after the first future time; and
discarding the second database transaction based on determining the second future time is after the first future time.

19. The system of claim 16, wherein the operations further comprise:
prior to receiving the second request:
presenting, in a graphical user interface (GUI), a representation of the future state of the data set, wherein the second request is based on the future state.

* * * * *

UNITED STATES PATENT AND TRADEMARK OFFICE
CERTIFICATE OF CORRECTION

PATENT NO. : 12,072,867 B2  
APPLICATION NO. : 17/861579  
DATED : August 27, 2024  
INVENTOR(S) : Cosby et al.

Page 1 of 1

It is certified that error appears in the above-identified patent and that said Letters Patent is hereby corrected as shown below:

In the Specification

In Column 2, Line 42, delete "QUEING" and insert -- QUEUING --, therefor.

In Column 5, Line 41, delete "class."" and insert -- class," --, therefor.

In Column 5, Line 42, delete ""salary." "residence."" and insert -- "salary," "residence," --, therefor.

In Column 12, Line 28, delete "QUEING" and insert -- QUEUING --, therefor.

In Column 17, Line 30, delete "queues" and insert -- queues. --, therefor.

In Column 19, Line 47, delete "(QOS)" and insert -- (QoS) --, therefor.

In the Claims

In Column 26, Line 9, in Claim 12, after "perform a second" delete "of".

Signed and Sealed this  
Seventh Day of January, 2025

Derrick Brent  
*Acting Director of the United States Patent and Trademark Office*